US012593380B2

(12) United States Patent
Zhai

(10) Patent No.: US 12,593,380 B2
(45) Date of Patent: Mar. 31, 2026

(54) TECHNIQUES FOR COLOR CONTROL IN DIMMABLE LIGHTING DEVICES AND RELATED SYSTEMS AND METHODS

(71) Applicant: Luminus Devices, Inc., Woburn, MA (US)

(72) Inventor: Jinhui Zhai, Union City, CA (US)

(73) Assignee: Luminus Devices, Inc., Woburn, MA (US)

( * ) Notice: Subject to any disclaimer, the term of this patent is extended or adjusted under 35 U.S.C. 154(b) by 0 days.

(21) Appl. No.: 16/131,225

(22) Filed: Sep. 14, 2018

(65) Prior Publication Data

US 2020/0092960 A1 Mar. 19, 2020

(51) Int. Cl.

| | |
|---|---|
| ***H05B 45/20*** | (2020.01) |
| ***F21V 23/00*** | (2015.01) |
| ***F21Y 113/13*** | (2016.01) |
| ***F21Y 115/10*** | (2016.01) |
| ***H05B 45/00*** | (2022.01) |
| ***H05B 45/24*** | (2020.01) |
| ***H05B 45/3577*** | (2020.01) |
| ***H05B 45/37*** | (2020.01) |

(52) U.S. Cl.

CPC ........... *H05B 45/20* (2020.01); *F21V 23/003* (2013.01); *H05B 45/00* (2020.01); *F21Y 2113/13* (2016.08); *F21Y 2115/10* (2016.08)

(58) Field of Classification Search

CPC .. F21Y 2115/10; F21Y 23/003; H05B 33/086; H05B 33/0806

USPC ........................................................ 315/291

See application file for complete search history.

(56) References Cited

U.S. PATENT DOCUMENTS

| | | | | |
|---|---|---|---|---|
| 8,659,235 | B2 * | 2/2014 | Vogler | H05B 45/395 327/520 |
| 9,730,291 | B1 * | 8/2017 | Janik | H05B 45/20 |
| 9,872,358 | B2 * | 1/2018 | Beijer | H05B 45/395 |
| 10,299,337 | B1 * | 5/2019 | Chen | H05B 45/44 |
| 11,259,379 | B2 * | 2/2022 | Rodriguez | H05B 45/20 |
| 2002/0048177 | A1 | 4/2002 | Rahm et al. | |
| 2010/0090604 | A1 | 4/2010 | Maruyama et al. | |
| 2010/0109537 | A1 * | 5/2010 | Nishino | H05B 45/40 315/294 |

(Continued)

OTHER PUBLICATIONS

International Search Report and Written Opinion for PCT/US2019/050739 mailed Oct. 15, 2019.

(Continued)

*Primary Examiner* — Wei (Victor) Y Chan

(74) *Attorney, Agent, or Firm* — Wolf, Greenfield & Sacks, P.C.

(57) ABSTRACT

Techniques for controlling the color of a light source during dimming are provided. A current control circuit may be arranged within a light source module and configured to adjust, according to a driving input current, the current path that passes through some of the lights (e.g., LEDs) in the module. If multiple current paths that pass through these lights have different impedances, a change in current path will cause the amount of current passing through these lights to increase or decrease. If the adjusted lights have a different color temperature than the other lights of the light source module, the change in current path as the driving current is adjusted can effect a change in color temperature as the light source module is dimmed.

10 Claims, 8 Drawing Sheets

(56) References Cited

U.S. PATENT DOCUMENTS

| | | | | |
|---|---|---|---|---|
| 2013/0229125 | A1* | 9/2013 | Yan | H05B 33/10 315/210 |
| 2015/0069918 | A1 | 3/2015 | Trattler | |
| 2015/0289325 | A1* | 10/2015 | Szolusha | H05B 45/38 315/201 |
| 2018/0027626 | A1* | 1/2018 | Wang | H05B 45/24 315/186 |

OTHER PUBLICATIONS

PCT/US2019/050739, Oct. 15, 2019, International Search Report and Written Opinion.

* cited by examiner

TECHNIQUES FOR COLOR CONTROL IN DIMMABLE LIGHTING DEVICES AND RELATED SYSTEMS AND METHODS

TECHNICAL FIELD

The present invention relates to light-emitting devices (e.g., LEDs) including systems (e.g., light source modules) for controlling the color of the light-emitting device during dimming of the light-emitting device.

BACKGROUND

Light-emitting diodes (LEDs) often can provide light in a more efficient manner than an incandescent light source and/or a fluorescent light source. As a result, LED bulbs and lamps are desirable to consumers as a means to reduce energy usage whilst providing light in a home or business.

In addition to energy usage, the correlated color temperature (CCT) of light produced by a light source is also often considered when selecting the light source. CCT (referred to henceforth as "color temperature") is a measure of the color appearance of "white" light emitted from an electric light source. The color temperature provides a general indication of the extent to which white light has a "cool" color, referring to more bluish tones, or a "warm" color, referring to more yellowish tones. The terms warm and cool are often used because traditional, incandescent lighting produces a soft white, sometimes slightly yellow, tone, and because warm light has long been viewed as desirable in light sources because it tends to make the colors in an environment feel warm and cozy.

Some light sources may be configured to be dimmable, meaning that they may be controlled to increase or decrease the intensity of light being produced. Dimmable light sources are often used in home or business environments. The color temperature of the light produced at each of the different available light intensities may be of interest so that a desired tone or tones can be produced while the light source is dimmed.

SUMMARY

The present application relates to light-emitting devices (e.g., LEDs) including systems (e.g., light source modules) for controlling the color of the light-emitting device during dimming of the light-emitting device.

According to some aspects, a light source module circuit is provided comprising a plurality of first LEDs connected in series, the first LEDs configured to produce light having first color temperatures, one or more control units connected in series with the plurality of first LEDs, a plurality of second LEDs connected in series, the second LEDs configured to produce light having second color temperatures, different from the first color temperatures, wherein the plurality of second LEDs is connected in parallel with the plurality of first LEDs and the one or more control units, and a current control circuit connected in parallel to the one or more control units and configured to, according to a driving current input to the plurality of first LEDs and the plurality of second LEDs, adjust a ratio of current passing through the plurality of first LEDs to current passing through the plurality of second LEDs.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
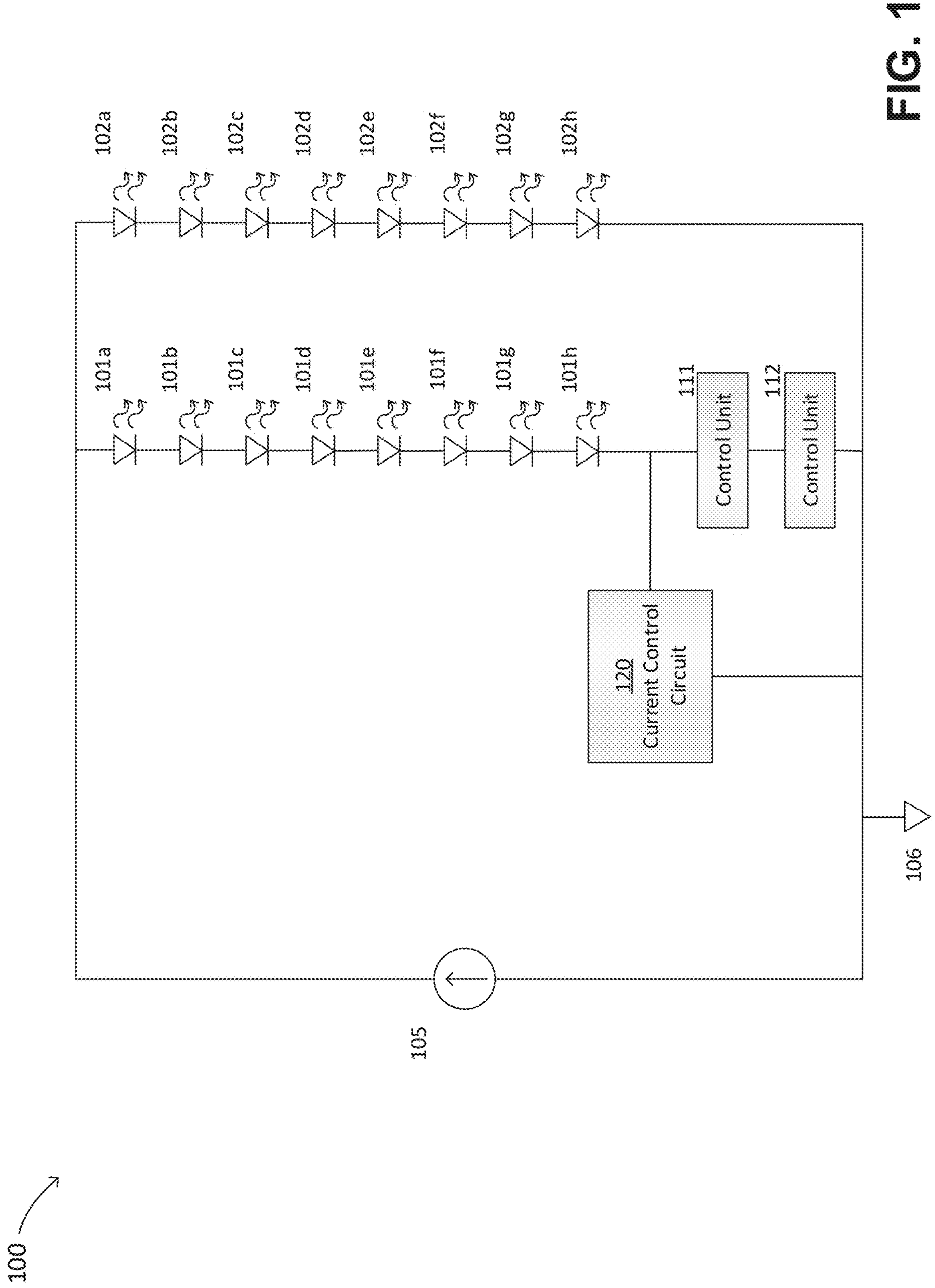
FIG. 1 depicts an illustrative circuit of a light source module configured to control the color of light produced during dimming, according to some embodiments.

Techniques for controlling the color of a light-emitting device during dimming of the light-emitting device are provided. As discussed above, warm light has long been viewed as desirable in light sources because it tends to make the colors in an environment feel warm and cozy. Incandescent lights, in particular, naturally emit light of a warm color, and this light becomes even warmer in color as the light is dimmed, even tending to seem orange or reddish in some cases. LED light sources produce light in a different manner to incandescent lights, however, and dimming an LED light source by reducing an amount of current supplied to the LED(s) generally has an effect of lowering the luminosity of the light produced whilst having little to no effect on the color temperature of the light.

To control the color of LED light sources during dimming, conventional light source modules incorporate LEDs of different color temperatures and control how much current goes through each of the different LEDs as the driving current of the light source module is reduced. The conventional approach requires numerous complex electronic components to produce this balance, however, such as a microcontroller to control the circuit and a memory to define the manner in which the microcontroller is to perform said control. In some cases, the light source module may also incorporate a current detection sensor, a current regulator, and/or switch circuitry to control the current to the different LEDs.

Some conventional light sources may, during dimming, bypass parts of a circuit containing one or more LEDs to reduce the current flowing through the bypassed LEDs, and therefore reduce the light produced by the bypassed LEDs. As a result of the relative brightness of LEDs of the light source changing, the color temperature of the light source may be controlled if the LEDs have different color temperatures. This type of approach may produce non-uniformities in the light, however. For example, in a lighting tube with evenly distributed warm and cool LEDs, at some point during dimming the LEDs being bypassed may receive a sufficiently low current that they turn off whilst the other LEDs remain on. The result is a light source that contains dark areas during dimming, which is undesirable.

The inventor has recognized and appreciated techniques for controlling the color of an LED light source during dimming that do not require complex electronic components such as a microcontroller. A current control circuit may be arranged within a light source module and configured to adjust, according to a driving input current, the current path that passes through some of the LEDs in the module. If multiple current paths that pass through these LEDs have different impedances (or different forward voltages), a change in current path will cause the amount of current passing through these LEDs to increase or decrease. If the adjusted LEDs have a different color temperature than the other LEDs of the light source module, the change in current path as the driving current is adjusted can effect a change in color temperature as the light source module is dimmed. While in some cases, current may entirely switch between paths, this is not a requirement since any alteration in the relative extent to which current flows down various paths may produce a change in color temperature. Moreover, it is important that the current through each LED of the circuit is smoothly changed when the light source is dimmed to avoid the aforementioned production of dark areas during dimming. Put another way, the techniques described herein allow for variation of the color temperature of the LED light source during dimming such that all LEDs of the light source turn off at substantially the same driving current.

As one example of the application of the techniques described herein, consider a light source module comprising two sets of LEDs with different color temperatures. One of the sets of LEDs is connected to two current paths that are parallel to one another. At a comparatively higher driving current, the current control circuit may operate to cause current to pass through the first set of LEDs and the first current path, in addition to the second set of LEDs. This higher driving current may produce a particular color temperature as a result of the relative brightness of the two sets of LEDs. At a comparatively lower driving current, however, the current control circuit may switch the current that passes through the first set of LEDs to instead follow the second current path, whilst current also passes through the second set of LEDs as before. Now, however, a greater or lower fraction of current may be passing through the first set of LEDs compared with the second set, because there is now a greater or reduced impedance, respectively, for the current to flow through the first set compared with the second set. As a result, the ratio of current passing through the first and second sets of LEDs may change, and consequently their relative brightness and the perceived color temperature of the light may change. By tuning the manner in which the current control circuit switches current in this way and by tuning the characteristics of the two current paths, a desired color temperature of the light source module may be produced as the light source module is dimmed. Once again, it is important that switching of the current by the current control circuit does not cause current to stop flowing through LEDs of the circuit, because this would produce dark areas in the light source.

According to some embodiments, a current control module may control the color temperature of light produced by a light source module by providing a bypass for the driving current. In particular, a current control module may comprise at least one transistor that switches modes as the driving current is decreased and thereby opens and/or closes current paths for the driving current to follow.

According to some embodiments, a light source module may comprise one or more control units connected along alternate current paths between which a current control module may perform switching as described above. Suitable control units may include any non-light emitting components that serve to alter the manner in which current flows through one of the alternate current paths compared with another of the alternate current paths. In some cases, control units may be selected to alter the manner in which current flowing through the control units changes as a function of the driving current to produce desired behavior. For example, the choice of one control unit over another may affect an amount of current flowing through the control unit (and/or through a different one of the alternate current paths) as the driving current changes. As such, the choice of control unit may affect how the color temperature of the light source module changes with driving current.

While the use of light-emitting components in place of the control units may produce a change in current flow during dimming, as discussed above this may lead to dark areas in the light source during dimming when the current passing through the light-emitting components is sufficiently low that the components are extinguished, yet other areas of the light source module are still emitting light. It may be true that a circuit containing light-emitting components in place of the control units has a higher efficiency because more light will be produced in this circuit for the same current when compared with the same circuit containing control units. The techniques described herein, however, may enable the benefit of smooth transitions in light intensity and color temperature during dimming that would not be produced by the circuit containing light-emitting components in place of the control units, albeit at the detriment of reduced efficiency.

Following below are more detailed descriptions of various concepts related to, and embodiments of, techniques for controlling the color of an LED light source during dimming. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts an illustrative circuit of a light source module configured to control the color of light produced during dimming, according to some embodiments. In the example of FIG. 1, circuit 100 includes a driving current source 105 and two sets of LEDs each connected in series 101$a$-101$h$ and 102$a$-102$h$. In addition, the set of LEDs 101$a$-101$h$ is connected in series with two control units 111 and 112, and to a current control circuit 120, which is connected to the control units 111 and 112 in parallel. A circuit ground 106 is provided.

The example of FIG. 1 is provided as an illustrative circuit in which a current control circuit may control the color of a light source module by changing the path of current through some, but not all, of the LEDs according to a driving input current. In illustrative circuit 100, the current control circuit 120 may be configured to adjust the extent to which current flows through the current control circuit compared with the control units 111 and 112 as a function of the driving current 105.

In the example of FIG. 1 there are two alternate current paths connected to the first set of LEDs 101*a*-101*h*: first, a path from LED 101*h* to the ground 106 via current control circuit 120; and second, a path from LED 101*h* to the ground 106 via the control units 111 and 112. As discussed above, if these paths have a difference in impedance (or forward voltage), altering the extent to which current flows down each of the two paths will cause a change in the relative amounts of current flowing through LEDs 101*a*-101*h* versus 102*a*-102*h*.

For example, suppose that the current flows along the second path via the control units 111 and 112 and the amount of current flowing through the LEDs 101*a*-101*h* and the control units is equal to the current flowing through the LEDs 102*a*-102*h*. Further, the current control circuit 120 operates to cause at least some of the current to flow along the first path through the current control circuit instead of the second path through the control units 111 and 112. Assuming the impedances (or the forward voltages) of the two paths are not equal, therefore, this operation may cause there to be more or less current passing through the LEDs 101*a*-101*h* compared with the LEDs 102*a*-102*h*. If the color temperatures of the LEDs 101*a*-101*h* differ from the color temperatures of the LEDs 102*a*-102*h*, the operation by the current control circuit 120 may thereby alter the color temperature of the combined light produced by the LEDs of circuit 100.

According to some embodiments, LEDs 101*a*-101*h* may be configured to produce light having different color temperatures compared with LEDs 102*a*-102*h*. This property of an LED will be referred to henceforth for simplicity as the color temperature of the LED. Furthermore, for purposes of comparing the color temperature of one LED to another, it is assumed that said comparison is performed with the same current input to the LED, since in some cases the color temperature of an LED may vary with input current.

In some embodiments, the color temperatures of LEDs 101*a*-101*h* are each greater than or equal to 1000K, 1500K, 2000K, 2500K or 3000K. In some embodiments, the color temperatures of LEDs 101*a*-101*h* are each less than or equal to 4000K, 3500K, 3000K, 2500K, 2000K, 1500K. Any suitable combinations of the above-referenced ranges are also possible (e.g., the color temperatures of each of LEDs 101*a*-101*h* is greater or equal to 1500K and less than or equal to 2500K, etc.). A preferred range for each of the color temperatures of LEDs 101*a*-101*h* is between 1500K and 3000K.

In some embodiments, the color temperatures of LEDs 102*a*-102*h* are each greater than or equal to 3000K, 3500K, 4000K, 4500K or 5000K. In some embodiments, the color temperatures of LEDs 102*a*-102*h* are each less than or equal to 8000K, 7500K, 7000K, 6500K, 6000K, 5500K, 5000K, 4500K, 4000K, 3500K, or 3000K. Any suitable combinations of the above-referenced ranges are also possible (e.g., the color temperatures of each of LEDs 102*a*-102*h* is greater or equal to 3500K and less than or equal to 4500K, etc.). A preferred range for each of the color temperatures of LEDs 102*a*-102*h* is between 3500K and 7500K.

In some embodiments, all of the LEDs 101*a*-101*h* may have a first color temperature and all of the LEDs 102*a*-102*h* may have a second, different color temperature. In other cases, the two sets of LEDs may exhibit a range of color temperatures; these two ranges may, or may not, overlap with one another.

According to some embodiments, LEDs 101*a*-101*h* and LEDs 102*a*-102*h* may be middle white LEDs, such as, but not limited to, commercially available LEDs with model numbers 3030, 3014, 2016, 2835, 5630, or combinations thereof. In some embodiments, one or more of LEDs 101*a*-101*h* and LEDs 102*a*-102*h* may have a frame-less emitting surface, such as, but not limited to, CSP(chip scale package) LEDs, Cube™ LEDs (e.g., models MP1616, MP1919) and/or or LED packages in which all of, or substantially all of, the package size is an emitting surface. These types of packages may enable the arrangement of the LEDs in a high density lighting array.

According to some embodiments, control units 111 and 112 may each be a non-light emitting component such as a non-emitting semiconductor diode, a resistor, or a transistor. Furthermore, any number of control units may be included along the current path between the set of LEDs 101*a*-101*h* and ground. In some embodiments, one or more control units may be connected in series with LEDs 102*a*-102*h*.

According to some embodiments, control units 111 and 112 may each be a pure resistance component having a linear I-V characteristic curve. According to some embodiments, control units 111 and 112 may each be a component having a non-linear I-V characteristic curve such as a photoresistor, a thermistor, a varistor, a diode, a transistor or a thyristor. According to some embodiments, one or both of control units 111 and 112 may comprise a semiconductor PN junction.

According to some embodiments, current control circuit 120 may be configured to open or close one or more circuit paths as the driving current 105 decreases. In some embodiments, such changes in the structure of the current control circuit 120 may be enabled by including one or more transistors in the current control circuit whose operation mode changes as the driving current 105 changes. In some embodiments, a voltage across a transistor of current control circuit 120 (e.g., the base-collector voltage and/or the base-emitter voltage) may pass a critical value, thereby causing the operation mode of the transistor to change. Such an operation mode change may open and/or close current paths through the current control circuit 120 from the LED 101*h* to ground, thereby causing a change in the amount of current that flows through the LEDs 101*a*-101*h*.

In some embodiments, current control circuit may be connected to parts of circuit 100 in additional ways other than those shown; for example the current control circuit 120 may be connected in parallel to the LEDs 101*a*-101*h*, or may be connected to the ground 106 via additional paths, which may contain one or more components, etc.

In some embodiments, all of the components of circuit 100 may be arranged on a single printed circuit board (PCB). For instance, circuit 100 may be arranged on an FR4 board, an MCPCB board, or a ceramic board. Current control circuit 120 may be a discrete control circuit module or an integrated circuit (IC). Arranging the components of circuit 100 on a single board may have an advantage of making a lighting fixture comprising circuit 100 more compact, lower cost, simply the manufacturing process, and/or reduce power loss.

In some embodiments, current control circuit 120 may comprise one or more variable resistors. Such a resistor may be external, meaning that it may be adjustable separately from the rest of the current control circuit, which may be an integrated circuit. A variable resistor may allow control over the dimming curve of circuit 100, being the relationship between the color temperature of light produced from the circuit and the driving current 105. For instance, varying the amount of resistance at one or more parts of the current control circuit may change the shape of the dimming curve. An example of this behavior is discussed below in relation to FIG. 7.

It will be appreciated that the example of FIG. 1 is provided to illustrate how a current control circuit 120 may control the flow of current between multiple paths and therefore control a relative amount of current flowing between two sets of LEDs during dimming, and that other configurations of such a circuit may be feasible. For instance, it will be appreciated that additional components may be arranged within circuit 100 without altering this function of the circuit. Furthermore, more than two current paths connected to one set of LEDs may also be considered, and may even include more than one current control circuit, which each have an effect upon the path(s) that current passing through the first set of LEDs subsequently follows. In addition, although two sets of LEDs are shown, any number of such sets may be included, including multiple sets with control units and/or multiple sets connected to a current control circuit.

Figure 2:
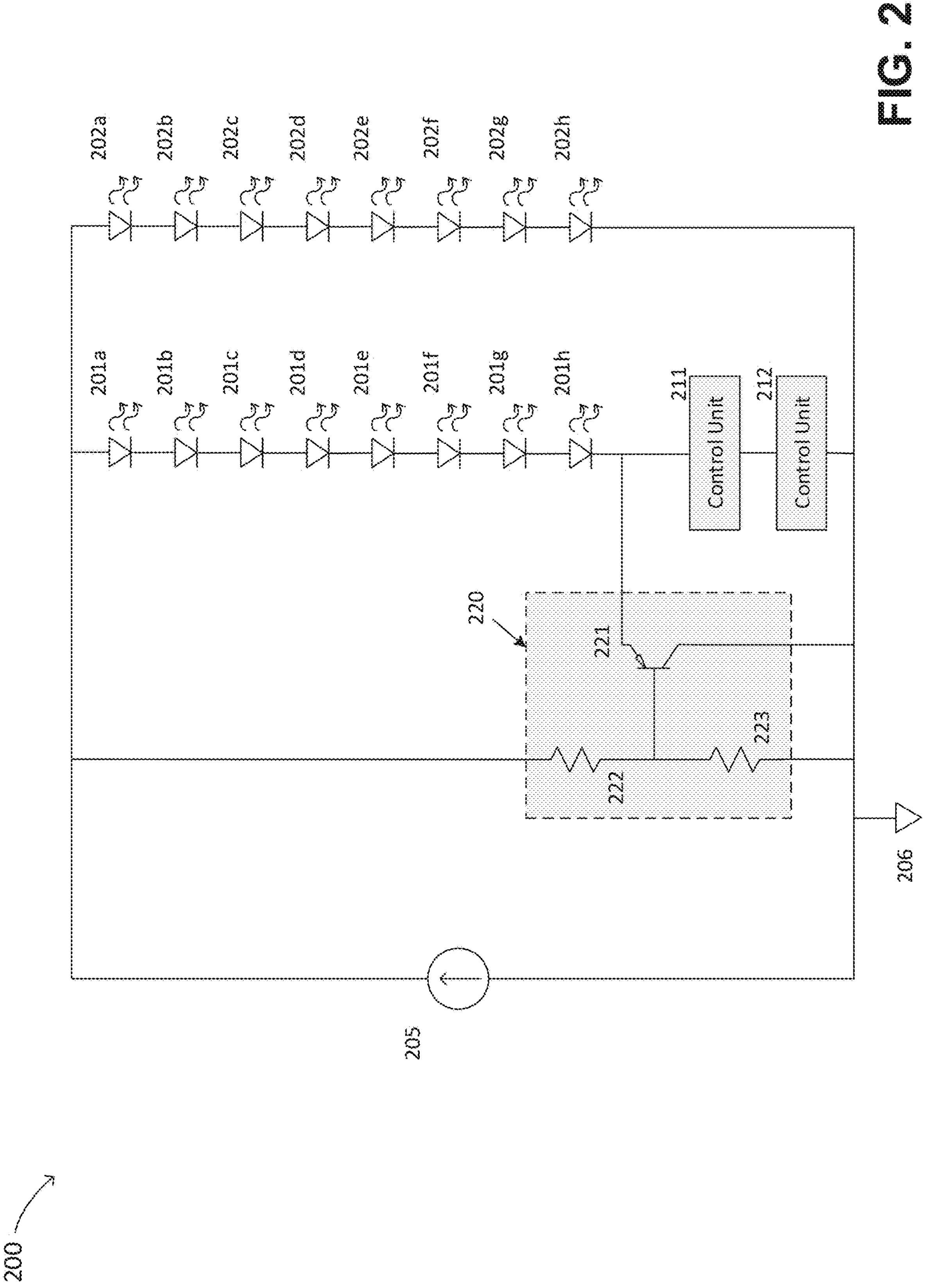
FIG. 2 depicts an illustrative circuit of a light source module configured to control the color of light produced during dimming with a first illustrative current control circuit configuration, according to some embodiments.

FIG. 2 depicts an illustrative circuit of a light source module configured to control the color of light produced during dimming with a first illustrative current control circuit configuration, according to some embodiments. FIG. 2 depicts an example of circuit 100 with an illustrative design for the current control circuit 120.

In the example of FIG. 2, circuit 200 includes a driving current source 205 and two sets of LEDs each connected in series 201*a*-201*h* and 202*a*-202*h*. In addition, the set of LEDs 201*a*-201*h* is connected in series with two control units 211 and 212, and to a current control circuit 220, which is connected to the control units 211 and 212 in parallel. A circuit ground 206 is provided.

In the example of FIG. 2, the current control circuit 220 includes a transistor 221 and resistors 222 and 223. At a comparatively high driving current 205, the potential difference $V_{BE}$ between the emitter of the transistor 221 and the base of the transistor, and the potential difference $V_{BC}$ between the base of the transistor and the collector may be such that the transistor is operating in a cutoff mode (e.g., $V_{BE}$ is less than around 0.7V and $V_{BC}$ is negative). As such, at this higher driving current, no current will pass from the LEDs 201*a*-201*h* through the current control circuit 220, and will instead pass through the control units 211 and 212.

As the driving current is reduced to dim the light source module of which circuit 200 is a component, $V_{BE}$ may rise to around 0.7V or greater, causing the transistor 221 to transition to a saturated or forward active operation mode. When this occurs, current will begin to pass through the current control circuit 220 and flow less through the control units 211 and 212. Eventually, the driving current may become sufficiently low that little or no current flows through the control units 211 and 212 and all or close to all of the current flowing through the LEDs 201*a*-201*h* also flows through the current control circuit 220. As the current transitions between these paths, current through the LEDs 201*a*-201*h* and current control circuit 220 will increase, leading to a greater fraction of light produced by circuit 200 being output from LEDs 201*a*-201*h* than LEDs 202*a*-202*h*, compared to the relative fractions of light that were produced from the two sets of LEDs at higher driving currents.

By way of example and not limitation, illustrative values of resistors 222 and 223 may be 100 kΩ and 350Ω, respectively.

Figure 3:
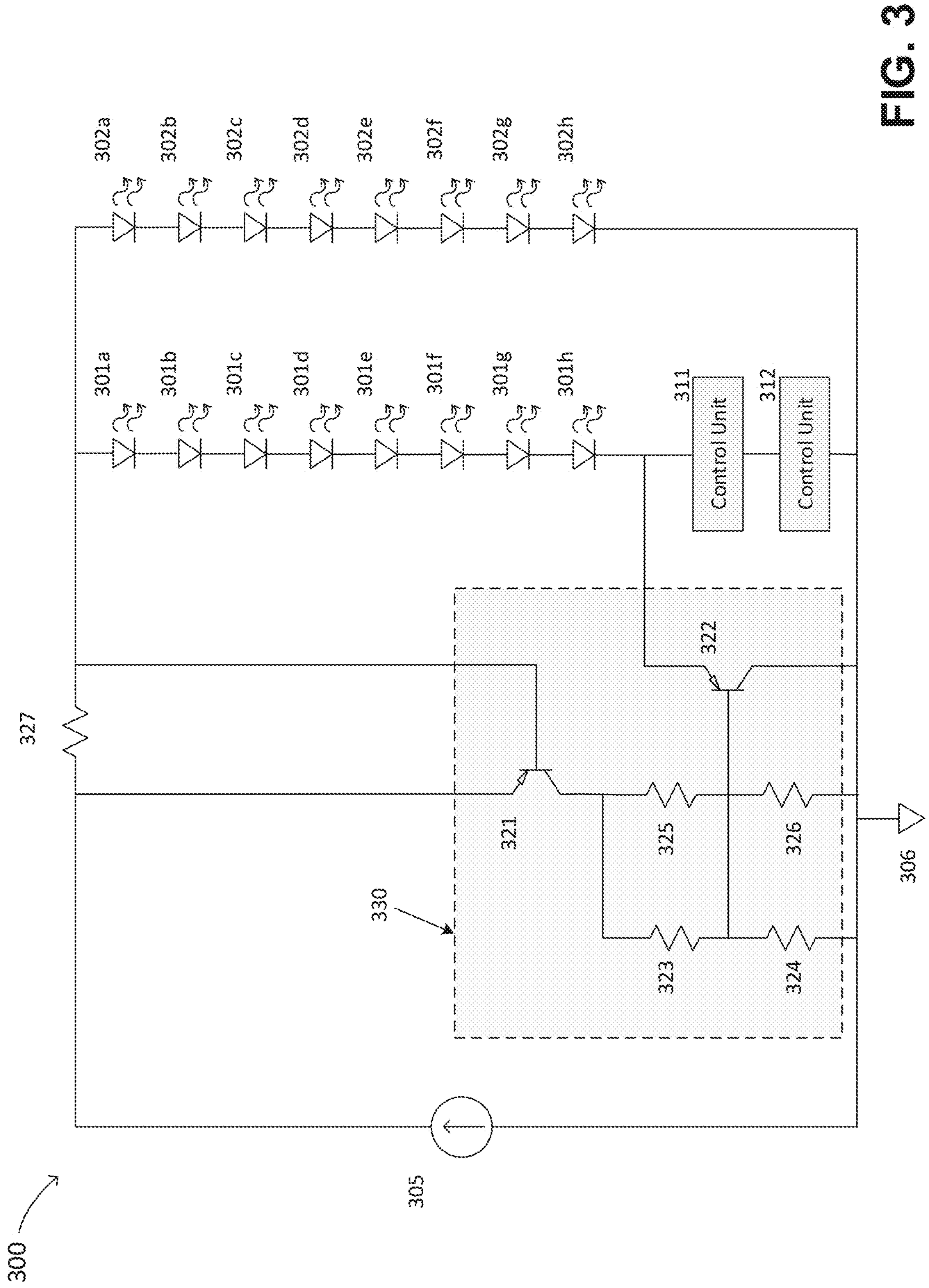
FIG. 3 depicts an illustrative circuit of a light source module configured to control the color of light produced during dimming with a second illustrative current control circuit configuration, according to some embodiments.

FIG. 3 depicts an illustrative circuit of a light source module configured to control the color of light produced during dimming with a second illustrative current control circuit configuration, according to some embodiments. FIG. 3 depicts an example of circuit 100 with an illustrative design for the current control circuit 120.

In the example of FIG. 3, circuit 300 includes a driving current source 305 and two sets of LEDs each connected in series 301*a*-301*h* and 302*a*-302*h*. In addition, the set of LEDs 301*a*-301*h* is connected in series with two control units 311 and 312, and to a current control circuit 320. A circuit ground 306 is provided.

In the example of FIG. 3, the current control circuit 320 includes transistors 321 and 322, in addition to resistors 323, 324, 325, 326 and 327. At a comparatively high driving current 305, the potential difference $V_{BE1}$ between the emitter of the transistor 321 and the base of the transistor 321 may be above around 0.7V so that the transistor 321 is in a forward active or saturation mode. The resistor 327 may be configured to facilitate such behavior. For instance, if the driving current is around 900 mA, the resistor 327 may have a resistance of around 1Ω.

In the example of FIG. 3, the resistors 321 and 322 may be configured so that, at the comparatively high driving current when transistor 321 is active, the potential difference $V_{BE2}$ between the emitter of the transistor 322 and the base of the transistor 322 is below around 0.7V. As a result, the transistor 322 may operate in a cutoff operation mode at a higher driving current and no current will pass from the LEDs 301*a*-301*h* through the current control circuit 320, and will instead pass through the control units 311 and 312.

As the driving current is reduced to dim the light source module of which circuit 300 is a component, $V_{BE1}$ may fall below around 0.7V, causing the transistor 321 to transition to a cutoff operation mode. This in turn causes the voltage at the base of transistor 322 to quickly reduce, which may cause $V_{BE2}$ to rise to around 0.7V or greater, causing the transistor 322 to transition to a saturated or forward active operation mode. When this occurs, current will begin to pass through the current control circuit 320 and flow less through the control units 311 and 312. Eventually, the driving current may become sufficiently low that little or no current flows through the control units 311 and 312 and all or close to all of the current flowing through the LEDs 301*a*-301*h* also flows through the current control circuit 320. As the current transitions between these paths, current through the LEDs 301*a*-301*h* and current control circuit 320 will increase, leading to a greater fraction of light produced by circuit 300 being output from LEDs 301*a*-301*h* than LEDs 302*a*-302*h*, compared to the relative fractions of light that were produced from the two sets of LEDs at higher driving currents.

By way of example and not limitation, illustrative values of the resistors 323-327 may be as follows: resistor 323=5 kΩ; resistor 324=1 kΩ; resistor 325=36 kΩ; resistor 326=10 kΩ; and resistor 327=0.8 kΩ.

Figure 4:
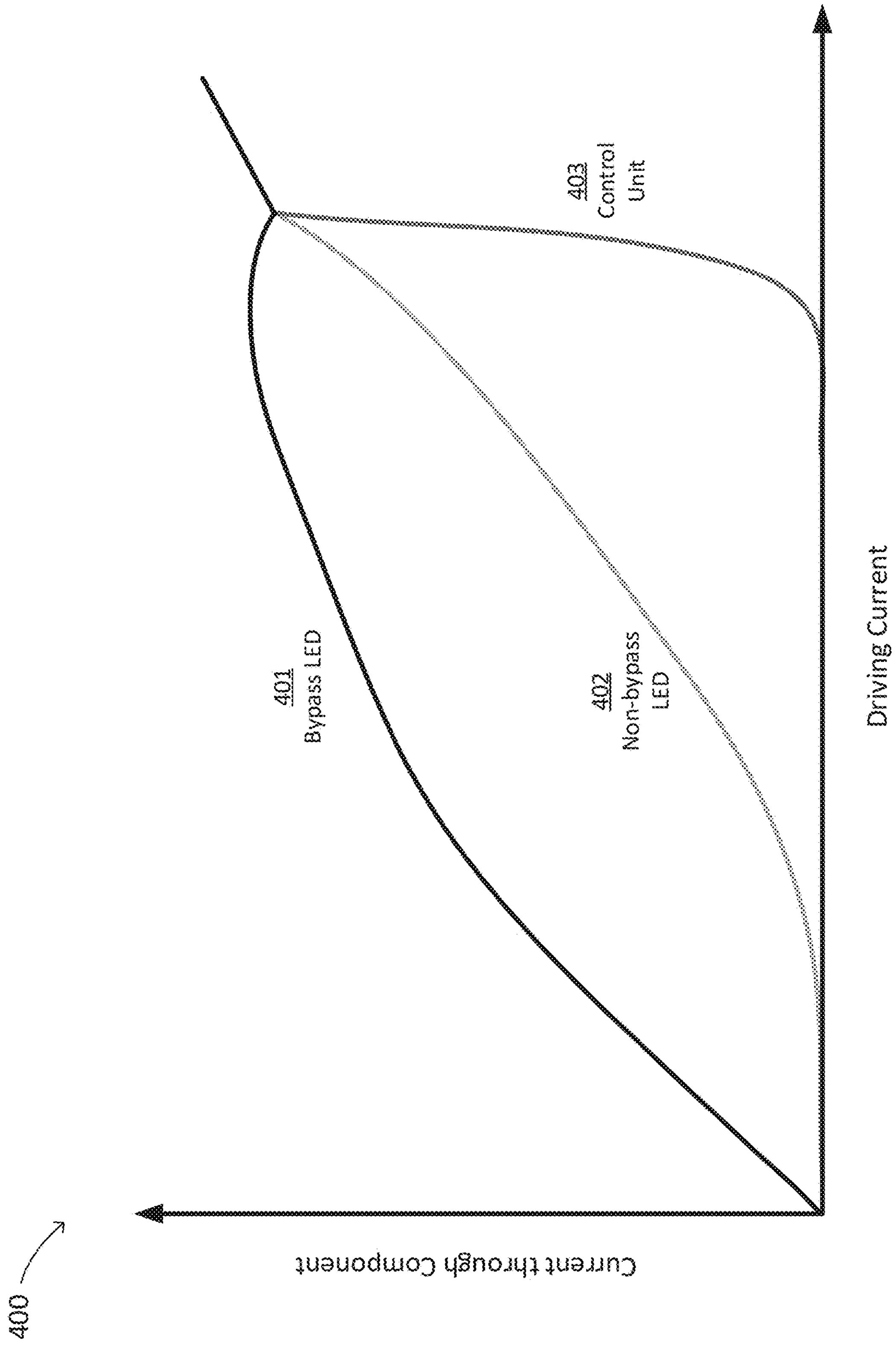
FIG. 4 is a graph depicting illustrative relationships between a driving current of a light source module and current through various components of the module, according to some embodiments.

FIG. 4 is a graph depicting illustrative relationships between a driving current of a light source module and current through various components of the module, according to some embodiments. Graph 400 may depict, for instance, the relative amounts of current passing through different LEDs and through a control unit in any of circuits

100, 200 or 300, as a function of the driving current (e.g., 105, 205 or 305, respectively). In the example of FIG. 4, an LED associated with a current control circuit that control the amount of current flowing through said LED, such as any of LEDs 101*a*-101*h*, 201*a*-201*h*, or 301*a*-301*h*, is referred to as an a "bypass LED." In addition, an LED not associated with a current control circuit, such as any of LEDs 102*a*-102*h*, 202*a*-202*h*, or 302*a*-302*h*, is referred to as an a "non-bypass LED."

As illustrated in the example of FIG. 4, the current through the bypass LED, the non-bypass LED, and the control unit, shown by lines 401, 402 and 403 respectively, are the same above some critical value of the driving current (as shown at the top right of graph 400). As such, the example of FIG. 4 may relate to a light source module in which an equal number of LEDs are arranged in each of the bypass and non-bypass sets.

Below this critical driving current, which may for instance be a driving current at which an alternate current path begins to open, the current passing through the control unit begins to drop and, simultaneously, the amount of current passing through the bypass LED becomes greater than the amount of current passing through the non-bypass LED. As discussed above, assuming the bypass LEDs have different color temperatures than the non-bypass LEDs, the behavior illustrated in FIG. 4 therefore demonstrates how the color temperature of the combined light may be controlled during dimming of a light source module due to a reducing driving current being supplied to the module. It may be noted in the example of FIG. 4 that the brightness of the non-bypass LED may be expected to drop to zero, or close to zero, at low driving currents, while the bypass LED remains actively producing light. This may allow, for example, a warm light to be produced from the light source module at low brightness.

Figure 5:
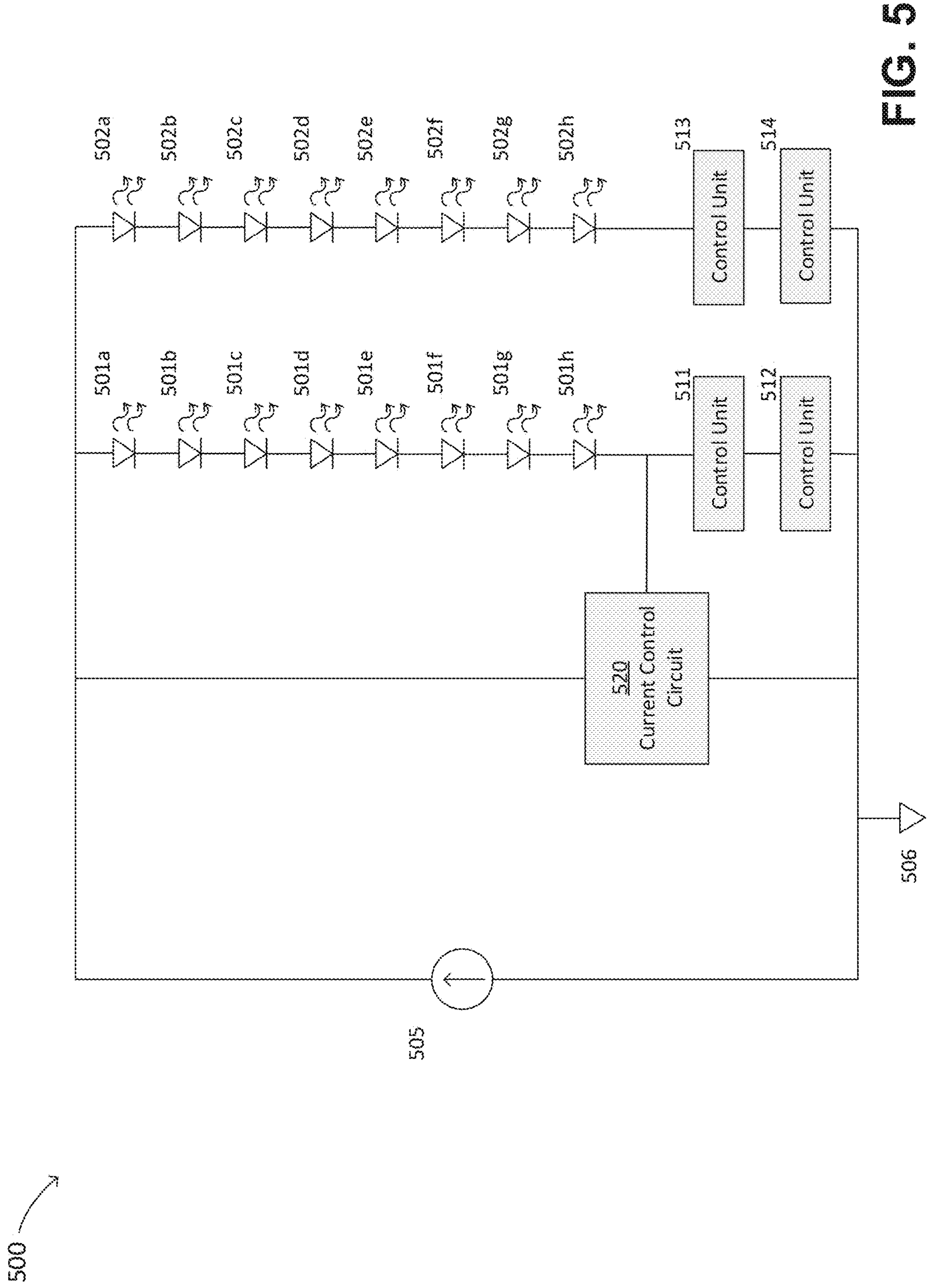
FIG. 5 depicts an illustrative circuit of a light source module configured to control the color of light produced during dimming, wherein parallel control units are provided, according to some embodiments.

FIG. 5 depicts an illustrative circuit of a light source module configured to control the color of light produced during dimming, wherein parallel control units are provided, according to some embodiments. FIG. 5 depicts an example of circuit 100 in which control units are connected in series with the second set of LEDs.

In the example of FIG. 5, circuit 500 includes a driving current source 505 and two sets of LEDs each connected in series 501*a*-501*h* and 502*a*-502*h*. In addition, the set of LEDs 501*a*-501*h* is connected in series with two control units 511 and 512, and to a current control circuit 520. The set of LEDs 502*a*-502*h* is connected in series with two control units 513 and 514. A circuit ground 506 is provided.

As discussed above, in some cases control units may be connected in series with LEDs whose current is not controlled directly by a current control circuit. This configuration may have an advantage of equalizing the behavior of multiple sets of LEDs at certain driving currents by mimicking the components along one of the current paths connected to current controlled LEDs (e.g., LEDs 501*a*-501*h*) along another path connected to non-current controlled LEDs (e.g., LEDs 502*a*-502*h*).

Figure 6:
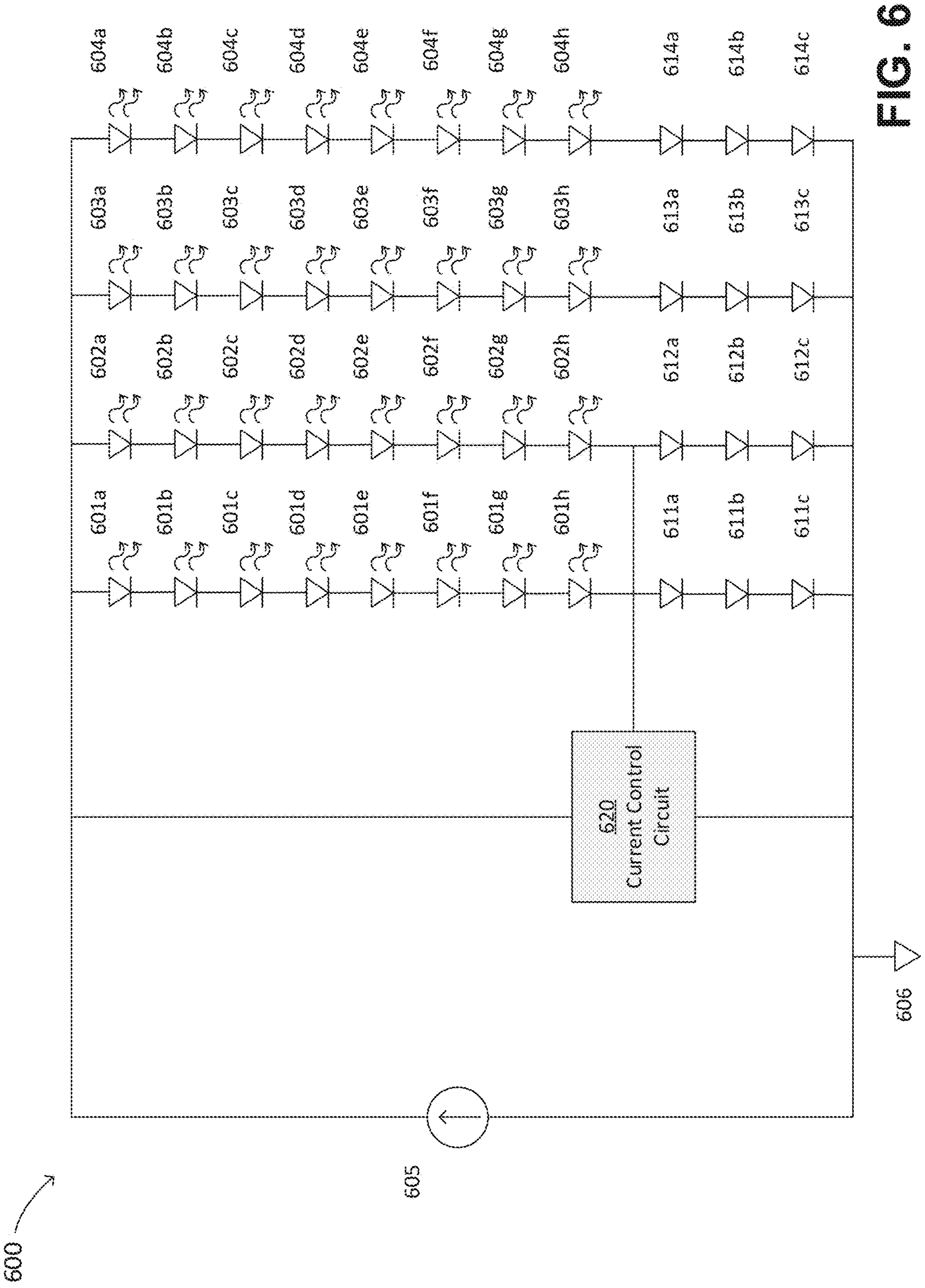
FIG. 6 depicts an illustrative circuit of a light source module configured to control the color of light produced during dimming, wherein diodes are provided as parallel control units, according to some embodiments.

FIG. 6 depicts an illustrative circuit of a light source module configured to control the color of light produced during dimming, wherein diodes are provided as parallel control units, according to some embodiments. FIG. 6 depicts an example of circuit 100 in which the control units are diodes (e.g., semiconductor diodes) and are connected in series with four sets of LEDs, two of which are current controlled by a current control circuit 620.

In the example of FIG. 6, circuit 600 includes a driving current source 605 and four sets of LEDs each connected in series 601*a*-601*h*, 602*a*-602*h*, 603*a*-603*h*, and 604*a*-604*h*. In addition, the set of LEDs 601*a*-601*h* is connected in series with three control units 611*a*-611*c*, which are diodes, and to current control circuit 620. The set of LEDs 602*a*-602*h* is connected in series with three control units 612*a*-612*c*, which are diodes, and to current control circuit 620. The set of LEDs 603*a*-603*h* is connected in series with three control units 613*a*-613*c*, which are diodes, and the set of LEDs 604*a*-604*h* is connected in series with three control units 614*a*-614*c*, which are diodes. A circuit ground 606 is provided.

Use of diodes as control units as in the example of FIG. 6 may have an advantage of a forward voltage that changes as the current through the control units changes. In particular, diodes 611*a*-611*c* and 612*a*-612*c* may be expected to have a non-linear I-V characteristic curve such that the forward voltage across the diodes quickly drops when the current through the control units becomes sufficiently low. Current control circuit 620 may be configured in any suitable manner, including as current control circuits 220 or 320 shown in FIGS. 2 and 3, respectively, and discussed above.

Figure 7:
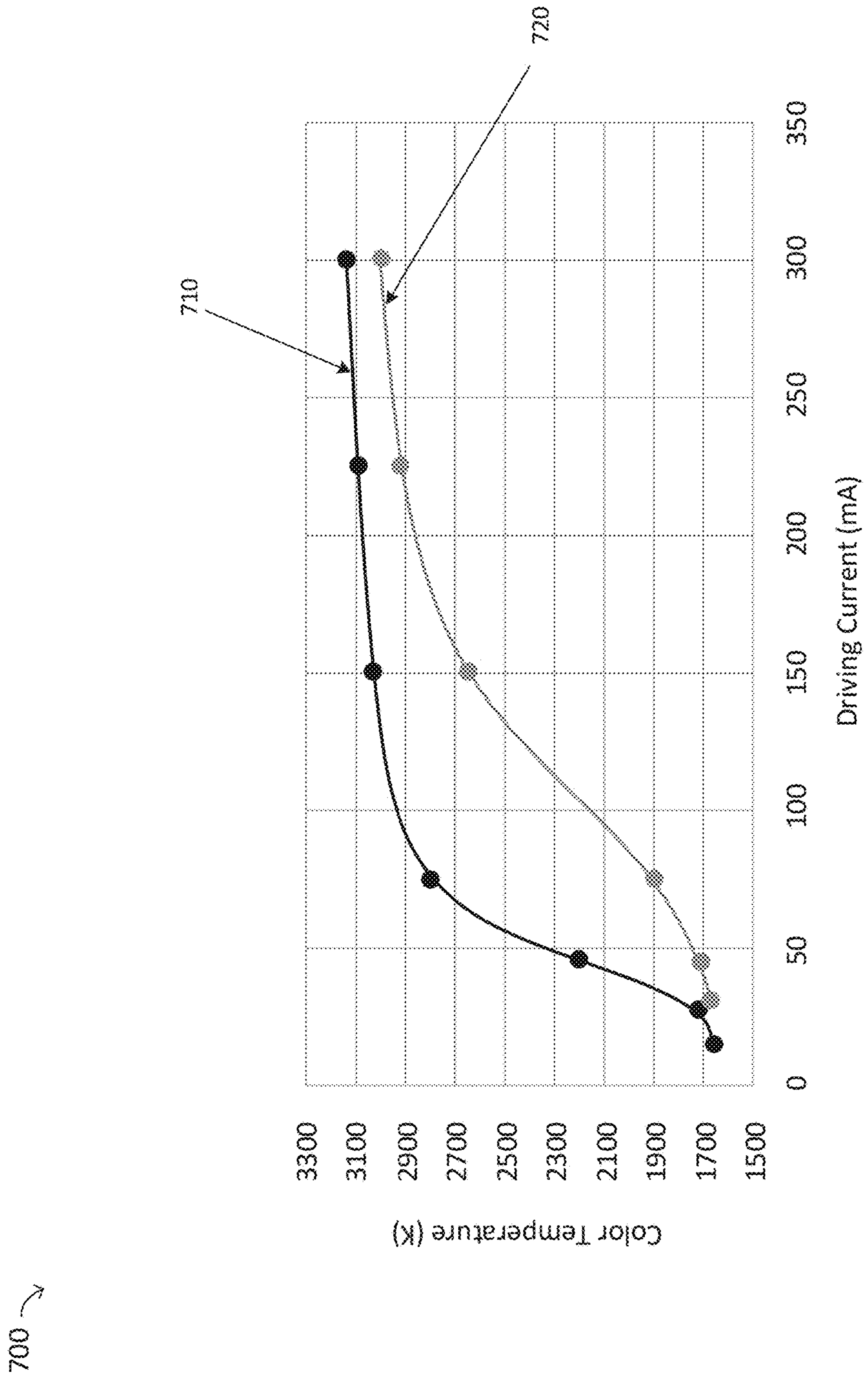
FIG. 7 is a graph depicting illustrative dimming color curves for two different light source modules, according to some embodiments.

FIG. 7 is a graph depicting illustrative dimming color curves for two different light source modules, according to some embodiments. Graph 700 depicts two illustrative dimming curves, being the relationship between the color temperature of light produced from a light source module and the driving current to the module. For example, a first light source module may exhibit dimming curve 710, wherein the color temperature becomes significantly warmer (lower color temperature) below a driving current of around 100 mA. A second light source module may instead exhibit dimming curve 720, wherein the color temperature becomes more gradually warmer as the driving current decreases.

As discussed above, a current control circuit may be configured based on a desired dimming curve by, for example, selecting components and/or components parameters to produce particular dimming curves. For instance, a resistor of circuit 100 (e.g., resistor 327 of FIG. 3) may, at least in part, determine the shape of the dimming curve of the light source module comprising the circuit. In some embodiments, such a resistor may be variable and so a user may be able to vary a single light source module to produce the different dimming curves 710 and 720 shown in FIG. 7 (and perhaps additional dimming curves as well) by varying the resistance of the variable resistor.

Figure 8B:
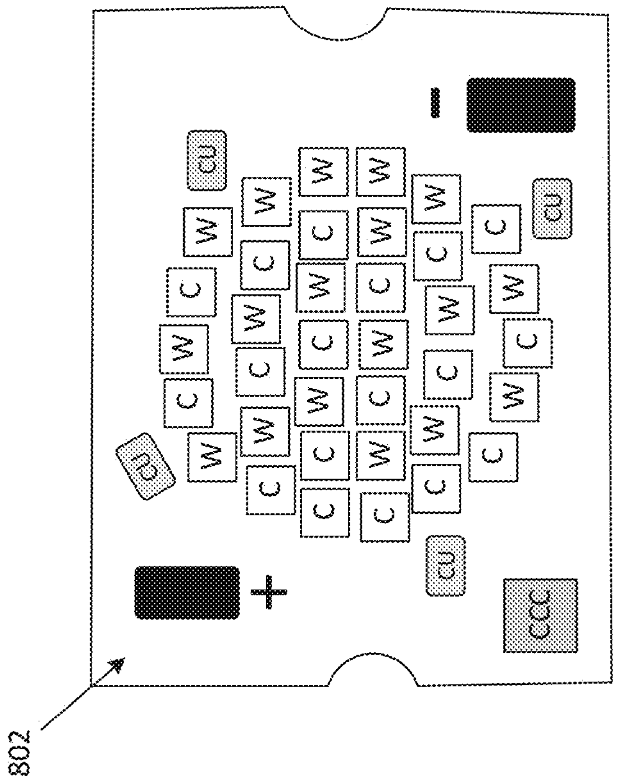
FIGS. 8A-8B depict illustrative color adjustable spot light sources on a single substrate, according to some embodiments.
Figure 8A:
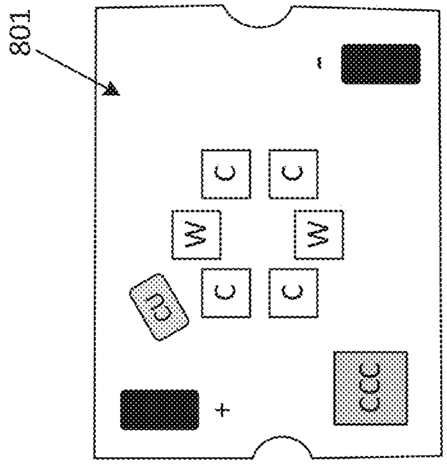

FIGS. 8A-8B depict illustrative color adjustable spot light sources on a single substrate, according to some embodiments. In the examples of FIGS. 8A and 8B, a plurality of LEDs having either a "warm" white color or a "cool" white color, labeled "W" and "C," respectively, are arranged on a substrate 801/802. Current control circuits, labeled "CCC," and control units, labeled "CU," are coupled to the LED arrays as per, for instance, the above-described circuit examples.

According to some embodiments, substrates 801 and 802 may comprise metal core printed circuit board (MCPCB), which may provide for good heat dissipation. In some embodiments, one or more of the LEDs (again, labeled "C" or "W") may be frameless LEDs, such as cube LEDs, so the emitting area can be packed closely on the substrates. A number of LEDs can be chosen to provide a desired array packaged light source emitting surface diameters (e.g., 6 mm, 9 mm, 14 mm, 18 mm, etc.) In some embodiments, a light source may instead be configured in a linear board for cove lighting, linear tube, linear fixture and/or panel applications, or a round board having a suitable diameter for A bulb, BR lamps, ceiling light and/or downlight applications.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

For example, it will be appreciated that a light source module as described herein may be arranged in any suitable lighting device, including but not limited to light bulbs (e.g., type A19 bulbs, bulged reflector (BR) bulbs or Parabolic Aluminized Reflector (PAR) bulbs), track lighting, spot lighting, downlights, etc.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A light source module circuit, comprising:

a plurality of first LEDs connected in series, the first LEDs configured to produce light having first color temperatures;

a first current path connected in series with the plurality of first LEDs and comprising one or more control units;

a plurality of second LEDs connected in series, the second LEDs configured to produce light having second color temperatures, different from the first color temperatures, wherein the plurality of second LEDs is connected in parallel with the plurality of first LEDs and the one or more control units; and a second current path connected in parallel to the one or more control units and comprising a current control circuit, wherein the current control circuit is configured to, according to a driving current input to the plurality of first LEDs and the plurality of second LEDs, adjust impedances and/or forward voltages of the first current path and/or the second current path thereby adjusting an amount of current that passes through the plurality of first LEDs while current simultaneously passes through the plurality of second LEDs, wherein the plurality of first LEDs, the one or more control units, the plurality of second LEDs and the current control circuit are fabricated on a single printed circuit board and the current control circuit comprises an integrated circuit coupled to an external resistor, wherein the current control circuit comprises a transistor, and wherein the impedances and/or forward voltages of the first current path and/or the second current path are adjusted, at least in part, according to whether the transistor is in an open mode or a cutoff mode, and wherein one or more resistors connect the base of the transistor to the driving current input and one or more resistors connect the base of the transistor to a circuit ground, wherein all of the first color temperatures are lower than any of the second color temperatures.

2. The light source module circuit of claim 1, wherein the one or more resistors connecting the base of the transistor to the driving current input are connected to the driving current input via a second transistor.

3. The light source module circuit of claim 1, wherein the one or more control units include one or more diodes.

4. The light source module circuit of claim 3, wherein the one or more control units are diodes.

5. The light source module circuit of claim 1, wherein the first color temperatures are each between 1500K and 3000K, and wherein the second color temperatures are each between 3500K and 7500K.

6. The light source module circuit of claim 1, wherein the plurality of first LEDs and the plurality of second LEDs comprise the same number of LEDs.

7. The light source module circuit of claim 1, further comprising one or more control units connected in series with the plurality of second LEDs.

8. The light source module circuit of claim 1, wherein the plurality of first LEDs comprises at least 3 LEDs and wherein the plurality of second LEDs comprises at least 3 LEDs.

9. The light source module circuit of claim 1, further comprising at least one variable resistor configured to, according to a resistance of the at least one variable resistor, adjust a relationship between the driving current and a color temperature of light produced by the light source module circuit.

10. The light source module circuit of claim 1, wherein the impedances and forward voltages of the first current path and the second current path are adjusted, at least in part, according to whether the transistor is in an open mode or a cutoff mode.

* * * * *